(12) United States Patent
Bishop

(10) Patent No.: US 10,449,908 B1
(45) Date of Patent: Oct. 22, 2019

(54) VEHICLE GARMENT HANGING DEVICE

(71) Applicant: Jerry W Bishop, Destin, FL (US)

(72) Inventor: Jerry W Bishop, Destin, FL (US)

( * ) Notice: Subject to any disclaimer, the term of this patent is extended or adjusted under 35 U.S.C. 154(b) by 0 days.

(21) Appl. No.: 16/103,527

(22) Filed: Aug. 14, 2018

(51) Int. Cl.
*B60R 7/10* (2006.01)
*B60R 11/00* (2006.01)

(52) U.S. Cl.
CPC ................ *B60R 7/10* (2013.01); *B60R 11/00* (2013.01); *B60R 2011/0003* (2013.01)

(58) Field of Classification Search
CPC ............... B60R 7/10; B60R 2011/0059; B60R 2011/0019; B60R 2011/0084; B60R 7/046; A47H 1/02; A47H 1/122; Y10S 224/927
See application file for complete search history.

(56) References Cited

U.S. PATENT DOCUMENTS

| | | | | |
|---|---|---|---|---|
| 3,863,728 A * | 2/1975 | Mittendorf | ............. | B60K 11/04 180/68.6 |
| D323,284 S * | 1/1992 | Thompson | ...................... | D6/320 |
| 5,219,105 A * | 6/1993 | Kravitz | ...................... | B60R 9/06 224/500 |
| 5,328,068 A * | 7/1994 | Shannon | ................... | B60R 7/10 211/113 |
| 5,332,108 A * | 7/1994 | Blass | .................... | A47B 96/067 211/90.02 |
| D397,565 S * | 9/1998 | Klein | ............................ | D6/513 |
| D413,464 S * | 9/1999 | Richter | ........................ | D12/416 |
| D414,358 S * | 9/1999 | Richter | ........................ | D12/416 |
| 5,954,252 A * | 9/1999 | Gebreselassie | ........... | B60R 7/10 224/311 |
| D414,635 S * | 10/1999 | Richter | ........................ | D12/416 |
| D414,967 S * | 10/1999 | Richter | ....................... | D12/416 |
| 6,260,750 B1 * | 7/2001 | Chiang | ..................... | B60R 7/10 224/275 |
| 6,832,711 B2 * | 12/2004 | Black | ................... | A43B 5/0425 224/261 |
| 7,395,997 B2 * | 7/2008 | Padden | ..................... | B60R 7/10 248/303 |
| 7,784,864 B2 * | 8/2010 | Feder | ...................... | B60R 7/043 297/188.06 |
| 9,290,133 B1 * | 3/2016 | Bishop | .................... | B60R 11/00 |
| 9,387,810 B1 * | 7/2016 | Bishop | ....................... | B60R 7/10 |
| 2002/0153337 A1 * | 10/2002 | Shuen | ................ | A46G 25/0692 211/123 |
| 2005/0092795 A1 * | 5/2005 | Matthew | .................... | B60R 7/10 224/313 |
| 2007/0096486 A1 * | 5/2007 | Niedziela | .................. | B60P 3/40 296/3 |
| 2007/0108241 A1 * | 5/2007 | Bass | ........................ | A45F 5/00 224/162 |

(Continued)

*Primary Examiner* — Brian D Nash
(74) *Attorney, Agent, or Firm* — Peter Loffler

(57) ABSTRACT

A device is removably secured within a vehicle and allows multiple hangers to be properly positioned on the device for clothing transport. The device uses a support bracket that straddles a grab bar of the vehicle. A rod passes through a pair of aligned slots on the support bracket and has end caps thereon to prevent hangers from sliding off of the rod. The rod also passes through a slot on a ladder bracket, this bracket having a relatively flat base plate that abuts against an interior surface of the vehicle, such as the roof surface, a window, or the door frame vehicle in order to stabilize the rod in a generally horizontal orientation.

8 Claims, 4 Drawing Sheets

(56) References Cited

U.S. PATENT DOCUMENTS

| | | | | |
|---|---|---|---|---|
| 2008/0156834 A1* | 7/2008 | Tipaldo | ................... | A45F 3/14 |
| | | | | 224/258 |
| 2008/0156837 A1* | 7/2008 | Brightman | ............... | B60R 7/10 |
| | | | | 224/313 |
| 2017/0203702 A1* | 7/2017 | Horgen | .................. | B60R 11/06 |
| 2019/0001854 A1* | 1/2019 | Gunn | ...................... | B60N 2/90 |

* cited by examiner

VEHICLE GARMENT HANGING DEVICE

BACKGROUND OF THE INVENTION

1. Field of the Invention

The present invention relates to a device that removably attaches to a garment hook or a passenger grab bar within a vehicle, such hangers can be supported by the device.

2. Background of the Prior Art

Many people want to take clothes with them when traveling by vehicle. A person may want to take a business suit in the vehicle to change into after a workout at the gym or take more formal clothes for a social function after work when there is not enough time to go home and change. Such situations tend not to be problematic as the person simply places the desired clothes onto a hanger and the hanger is hung from the hook located in the vehicle for such purpose, typically in the back seat area of the passenger compartment, or absent such a hook, from the passenger grab bar. When the clothing is desired, the hanger is removed from the hook or grab bar and the job is finished.

Problems arise when multiple items of clothing need to be transported, such as when a person is going on a weekend getaway and does not want to fold his or her clothes into a suitcase or on the back seat or a person is simply picking up multiple freshly cleaned and pressed items from the dry cleaners. Typically the hook can support one or at best two hangers which may prove too little capacity for a person with multiple items of clothing on hangers. While a grab bar may support more than a couple of hangers, placement of multiple items of clothing on multiple hangers onto a grab bar tends to scrunch the clothing items together, often wrinkling them so that the clothing items do not fare any better than being laid on the back seat of the vehicle.

One way to overcome this problem is the use of a hanger rod that stretches between the interior sides of the vehicle, the hanger rod being a tension bar that is supported against the sides of the vehicle via the biasing of the hanger bar's internal springs. The hanger bar is capable of carrying a substantial number of clothing items allowing the items to remain separated during the journey so as to reduce the risk of wrinkling and folding of the items. While effective, the hanger bar is not without problems. One problem with the hanger bar is that depending on the slope of the interior side wall of the vehicle, the tension bar may not get a sufficient grip on the side walls and be prone to slippage, especially if the clothing load is large. Additionally, many drivers simply get distracted by a bar that is positioned across the rear window of the vehicle. Further, depending on the architecture of the vehicle, the hanger bar must be positioned so as to leave no room for rear seat passengers.

To address these hanger bar problems, devices have been proposed that are located on one side of the vehicle and extend out a relatively short distance from the side wall (which includes the lower section of the roof line), which distance is sufficient to be able to hold sufficient clothing items for most people's needs. As such devices only protrude a short distance from a vehicle's interior side wall, they tend to not unduly distract the driver of the vehicle and do not rob back seat passengers of their seating real estate.

However, these prior art devices also have their shortcomings. Many of the devices are relatively complex in design and construction so as to be cost-prohibitive to produce so as to be economically unattractive to the average consumer. Some devices require elaborate installation, often with the attendant requirement of the need to make a permanent alteration to the vehicle, which many vehicle owners are unwilling to undertake. Still some devices have only a single point of support, that being at the attachment of the device to the vehicle hook, so that relatively heavy clothing loads cannot be supported by such devices.

What is needed is a device that allows a person to be able to hang multiple clothing items, separated from one another, within a vehicle, which device overcomes the above stated shortcoming found in the art. Specifically, such a device must not stretch across the entire vehicle passenger compartment so as to not be distractive to the driver of the vehicle and so as to not prevent passengers from occupying the back seat of the vehicle. Such a device must be relatively simple in design and construction and must be easy to install into and remove from the vehicle without the need to make permanent alterations to the vehicle. The device must be able to support a relatively heavy clothing load.

SUMMARY OF THE INVENTION

The vehicle garment hanging device of the present invention, which is a furtherance of my inventive work disclosed in my U.S. Pat. No. 9,290,133, issued on Mar. 22, 2016, and my U.S. Pat. No. 9,387,81, issued on Jul. 12, 2016, each of these two patents incorporated herein by reference in their entirety, and continues to address the aforementioned needs in the art by providing a device that quickly and easily hangs in the passenger compartment of a vehicle and holds multiple items of clothing in a manner so as to prevent such clothing items from becoming wrinkled. The vehicle garment hanging device is supported on a single side of the vehicle so as to not be an undue distraction to the driver and so as not to make the back seat area uninhabitable for passengers. The vehicle garment hanging device is of relatively simple design and construction, being produced using standard manufacturing techniques, so as to be economically attractive to potential consumers for this type of product. Installation of the vehicle garment hanging device within the vehicle is quick, does not require any tools, and does not require any alterations, permanent or temporary, to be made to the vehicle. The vehicle garment hanging device has multiple points of load support so that a relatively heavy clothing load can be supported by the device.

The vehicle garment hanging device is comprised of a rod that has a first end, an opposing second end, and a medial section therebetween. A U-shaped support bracket has a pair of first slots that are spaced apart from and aligned with one another. A ladder bracket has a base plate that has an upper surface and a lower surface such that an extension depends downwardly from the lower surface of the base plate and such that a second slot is located in the extension. The support bracket straddles a grab bar of the vehicle and the rod passes through the pair of first slots in order to be supported from the grab bar and also passes through the second slot with the upper surface of the base plate positioned against an interior surface of the vehicle, such as the roof surface, a window, or the door frame in order to stabilize the structure in position. An end cap located on at least the first end of the rod. The shape of the first slots of the support bracket corresponds to the shape of an outer surface of the rod, each being U-shaped (this includes being semi-circular). Additionally, the shape of the second slot of the support bracket corresponds to the shape of an outer surface of the rod, again being U-shaped (again including being semi-circular). The upper surface of the base plate is basically flat but may have small ridges or other textured surface or have a mat finish to help prevent slipping. The support bracket may be made from a flexible material so as to be bent into its U-shape.

BRIEF DESCRIPTION OF THE DRAWINGS

Similar reference numerals refer to similar parts throughout the several views of the drawings.

DESCRIPTION OF THE PREFERRED EMBODIMENT

Figure 1:
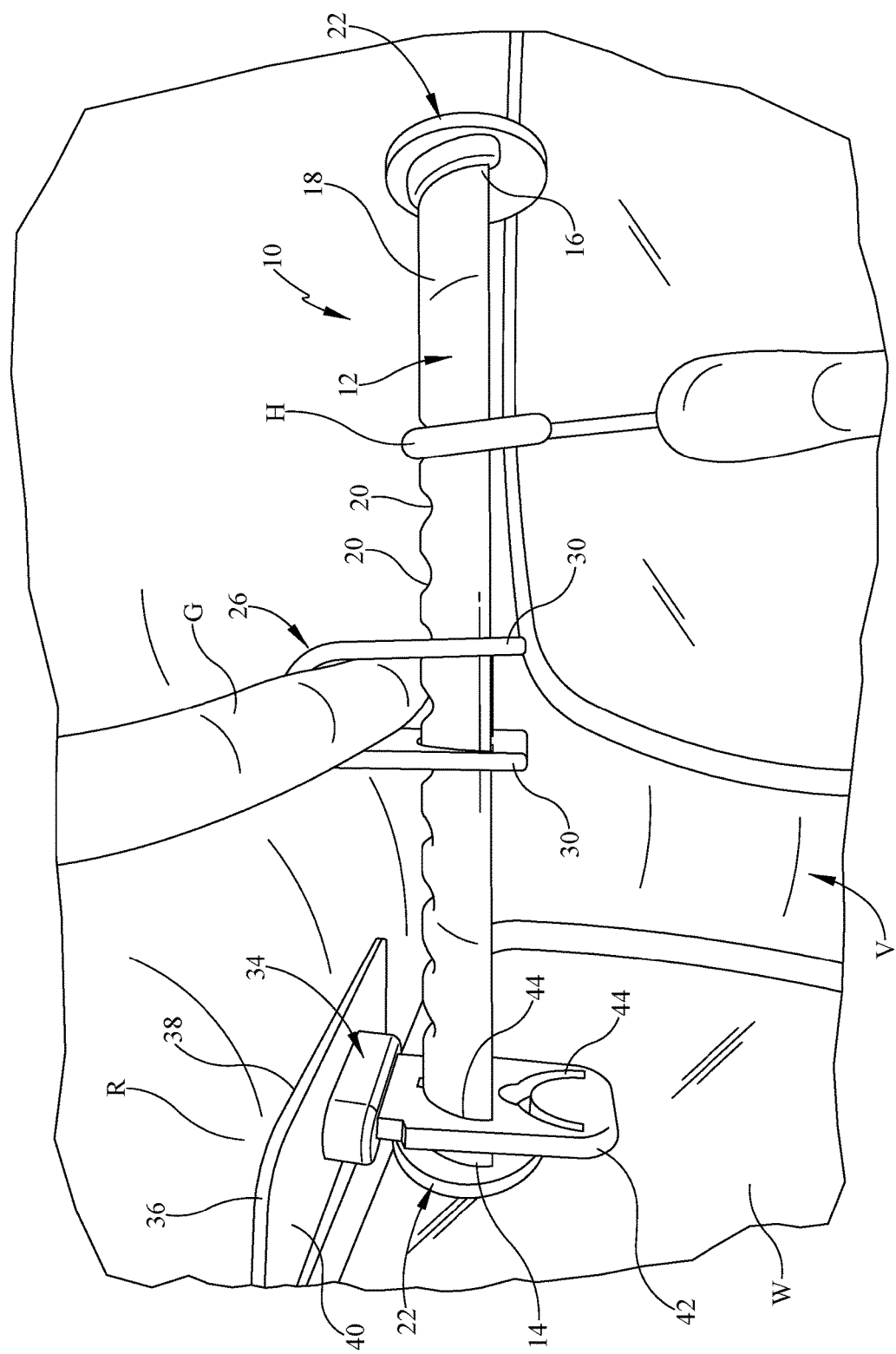
FIG. 1 is an environmental perspective view of the of the vehicle garment hanging device taken from a first direction.
Figure 2:
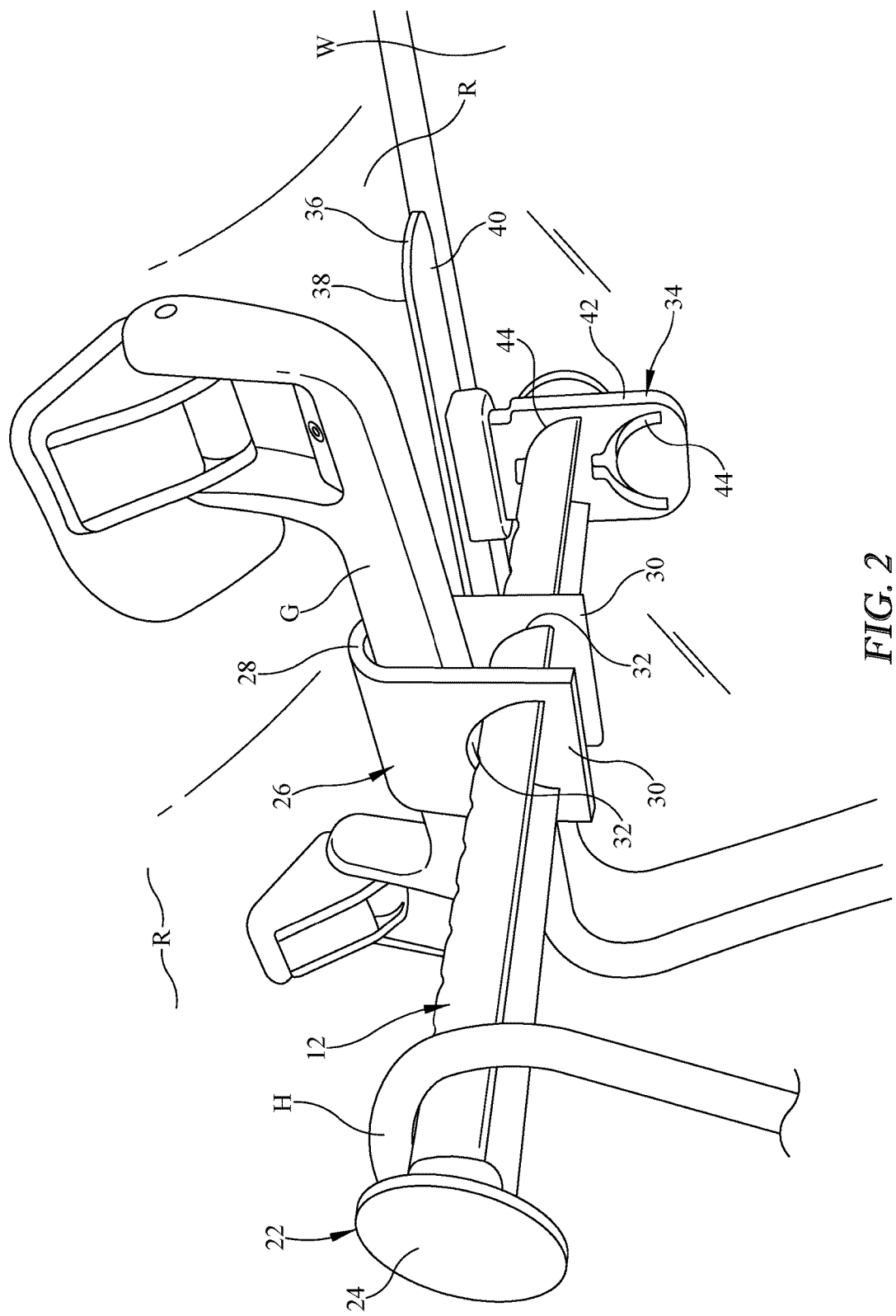
FIG. 2 is an environmental perspective view of the vehicle garment hanging device taken from a second direction.
Figure 3:
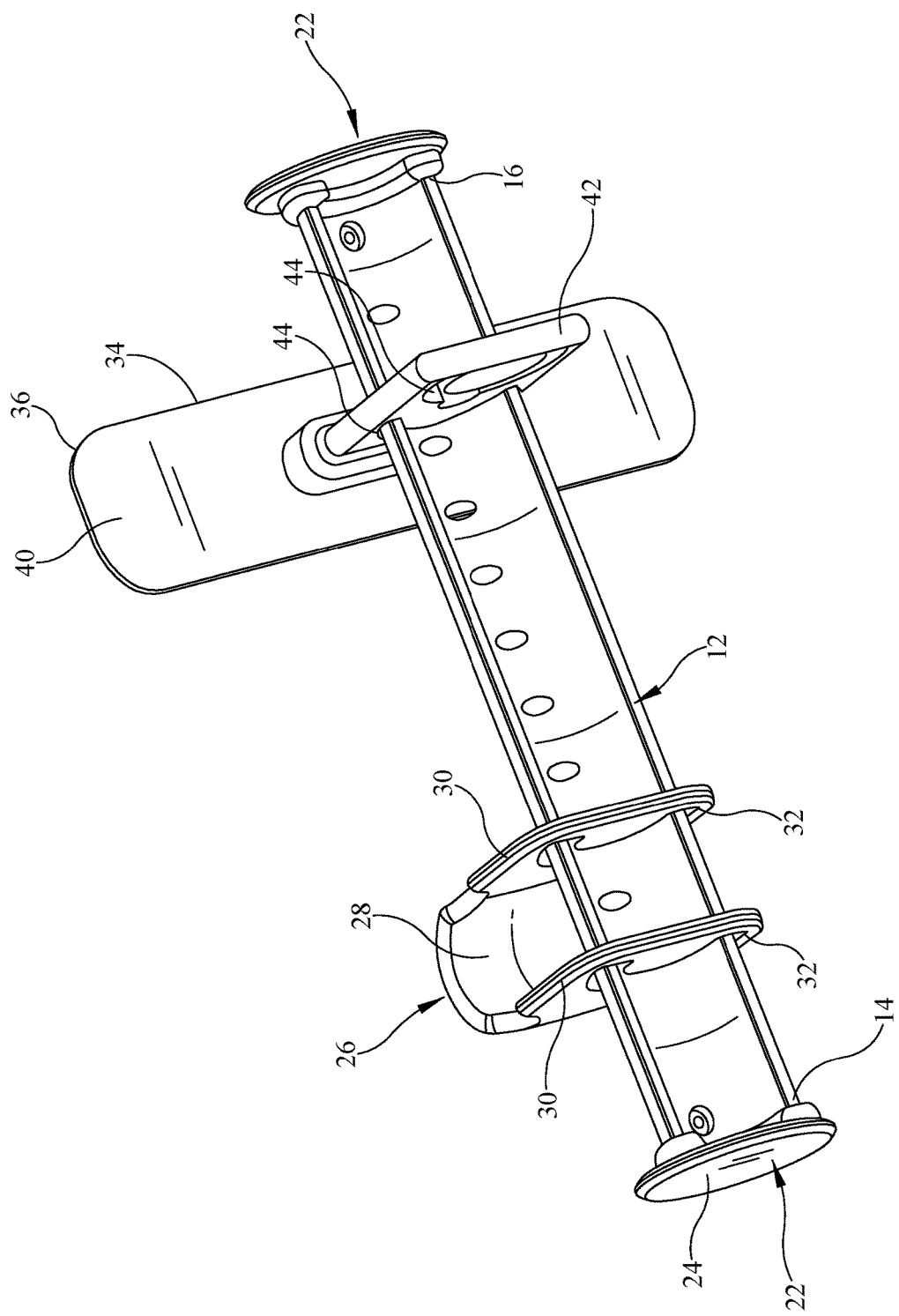
FIG. 3 is a perspective view of the vehicle garment hanging device of FIGS. 1 and 2.

Referring now to the drawings, it is seen that the vehicle garment hanging device of the present invention, generally denoted by reference numeral 10, is comprised of a an elongate rod 12 which may be made from any appropriate material, such as PVC, etc., that has a first end 14 and a second end 16. The rod 12 is generally U-shaped such that its upper surface 18 is arcuate and has a series of spaced apart detents 20 located along its length. An end cap 22 is located at each end of the rod 12, and are, advantageously, removable by having the end of the rod 12 be received within an appropriate opening (not separately numbered) within the end cap 22. The outer surface 24 of the end caps 22 is relatively flat or may be slightly outwardly curved. The end caps 22 are made from the same or similar material as is used to make the rod 12 or the end caps 22 can be made from rubber, silicone or similar material.

Figure 4:
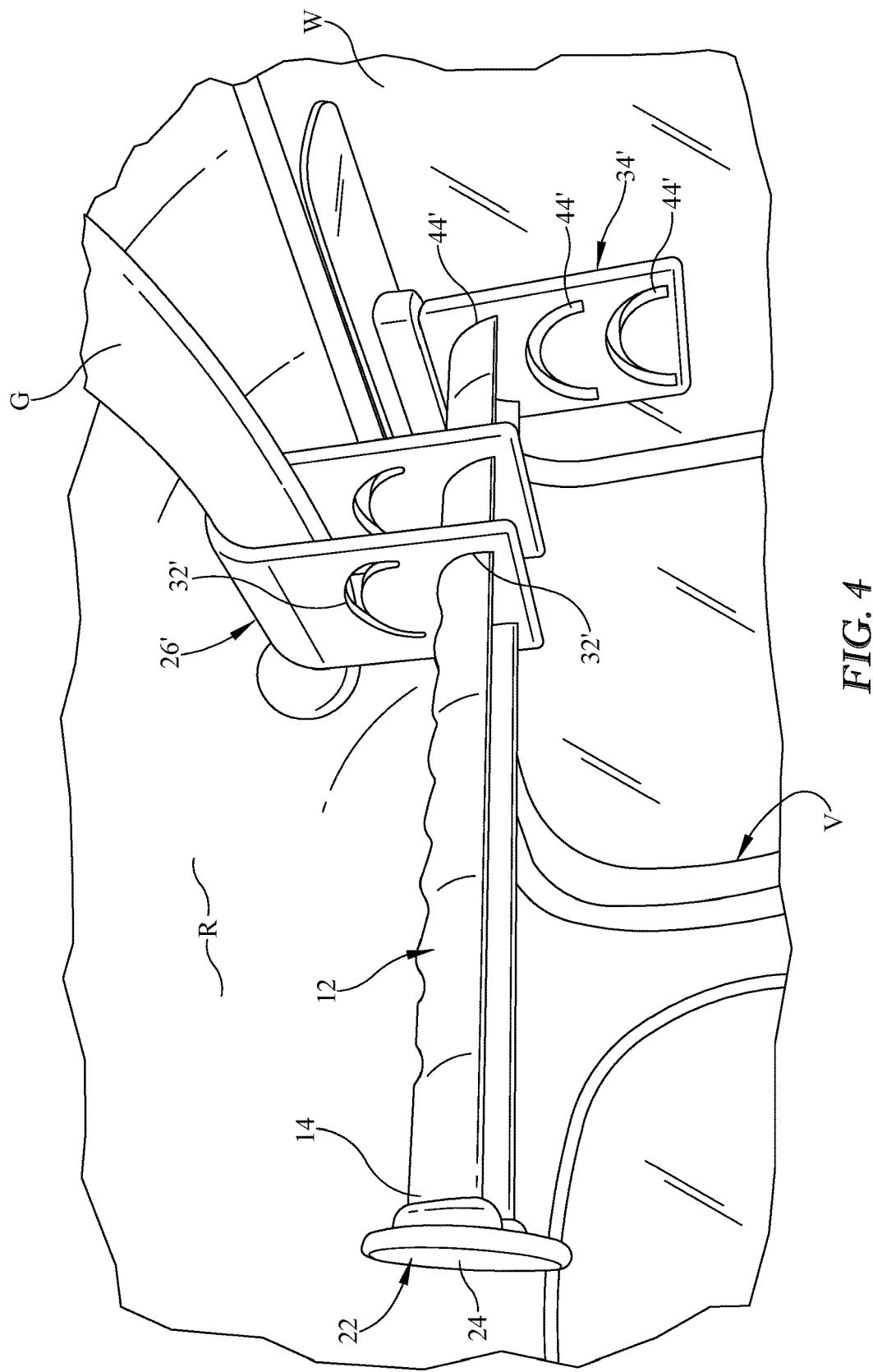
FIG. 4 is an environmental perspective view of a larger version of the vehicle garment hanging device of the present invention installed within a vehicle.

A support bracket 26 is generally U-shaped so as to have a curved base 28 with a pair of straight coextensive legs 30 extending from either end of the base 28. As seen, a pair of first slots 32 is located on each leg 30 of the support bracket, one first slot 32 per leg such that each pair of first slots 32 are the same size and align with one another. Each first slot 32 is sized and dimensioned to allow the rod 12 to pass therethrough. As seen in FIG. 4, more than one pair of first slots 32' can be provided on the support bracket 26'. The support bracket 26 can be made from the same or similar material used to make the rod 12 and thus be fixed in its shape, or can be made from a flexible material, such as rubber or silicone, and bent into is U-shape for use as more fully discussed below.

A ladder bracket 34 has a base plate 36 that has a relatively flat upper surface 38, which may be ridged or otherwise textured or have a matte or other appropriate non-slip finish. The base plate 36 also has a lower surface 40. The corners of the base plate 36 are rounded to help prevent damage to the roof surface R of a vehicle V during installation and use as more fully discussed below. An extension 42 depends downwardly from the lower surface 40 of the base plate 36 and can be either fixedly or removably attached thereto. A pair of second slots 44 is located on the extension 42 in spaced apart fashion. Each second slot 44 is substantially similar in size and shape to the first slots 32 located on the support bracket 26 so that the rod 12 can pass through each of the second slots 44. As seen in FIG. 4, more than two second slots 44' can be provided on the ladder bracket 34' or even a single slot can be used (single slot not separately illustrated). The ladder bracket 34 can be made from the same or similar material used to make the rod 12.

In order to use the vehicle garment hanging device 10 of the present invention, the support bracket 26 is placed over a grab bar G of a vehicle V so as to straddle the grab bar G. If the support bracket 26 is flexible, it is bent into its U-shape so that the first slots 32 align with one another. The rod 12 is passed through each of the two first slots 32 (or selected first slot 32' pair if more than one pair of first slots 32' is provided). The rod 12 is now supported by the grab bar G. The rod 12 is passed through a selected second slot 44 on the ladder bracket 34 and the base plate 36 is positioned against a roof surface R (or window W or door frame D) of the vehicle V. End caps 22 are placed onto the ends of the rod 12, if desired, so as to help prevent items placed onto the rod 12 from sliding off.

The vehicle garment hanging device 10 is now ready for use and can receive hangers H thereon, with each hanger H received within one of the detents to help prevent the hanger H and its cargo from sliding along the rod 12. The rod 12 is passed through the particular second slot 44 (and particular first slot 32' pair of the support bracket 26' if the support bracket 26' comes with multiple first slot 32' pairs) that allows the positioning of the ladder bracket 34 in such manner so as to make the rod 12 substantially horizontal or possibly titled slightly upwardly in proceeding from the interior surface of the vehicle V inward in order to help retain the cargo aboard the rod 12. This takes into account the drop of the particular grab bar G selected as well as the drop of the roof surface R of the vehicle V between the location of the grab bar G and the location whereat the ladder bracket 34 is positioned. The support bracket 26 supports the rod 12 and its cargo provides the initial stabilization of the rod 12 in its substantially horizontal position while the ladder bracket 34 provides a more substantial additional stabilization of rod 12. By having the rod 12 be U-shaped (may also be considered semi-circular), and the first slots 32 and the second slots 44 being of a similar shape, as opposed to being rounded as in my previous design, prevents the rod 12 from rotating within the various slots 32 and 44.

While the invention has been particularly shown and described with reference to an embodiment thereof, it will be appreciated by those skilled in the art that various changes in form and detail may be made without departing from the spirit and scope of the invention.

I claim:

1. A support device in combination with a vehicle for hanging from a grab bar of the vehicle, the support device comprising:

an elongate rod having a first end, an opposing second end, and a medial section therebetween;

a U-shaped support bracket having a pair of first slots that are spaced apart from and aligned with one another;

a ladder bracket having a base plate that has an upper surface and a lower surface such that an extension depends downwardly from the lower surface and such that a second slot is located in the extension; and wherein the support bracket is adapted to straddle the grab bar and the rod passes through each of the pair of first slots and through the second slot and the upper surface of the base plate is adapted to abut an interior surface of the vehicle.

2. The support device as in claim 1 further comprising an end cap located on the first end of the rod.

3. The support device as in claim 1 wherein the shape of the first slots of the support bracket corresponds to the shape of an outer surface of the rod.

4. The support device as in claim 3 wherein each first slot is U-shaped.

5. The support device as in claim 3 wherein the shape of the second slot of the support bracket corresponds to the shape of an outer surface of the rod.

6. The support device as in claim 5 wherein the each of the first slots and the second slot are each U-shaped.

7. The support device as in claim 1 wherein the upper surface of the base plate is flat.

8. The support device as in claim 1 wherein the support bracket is made from a flexible material.

\* \* \* \* \*